Figure 1:
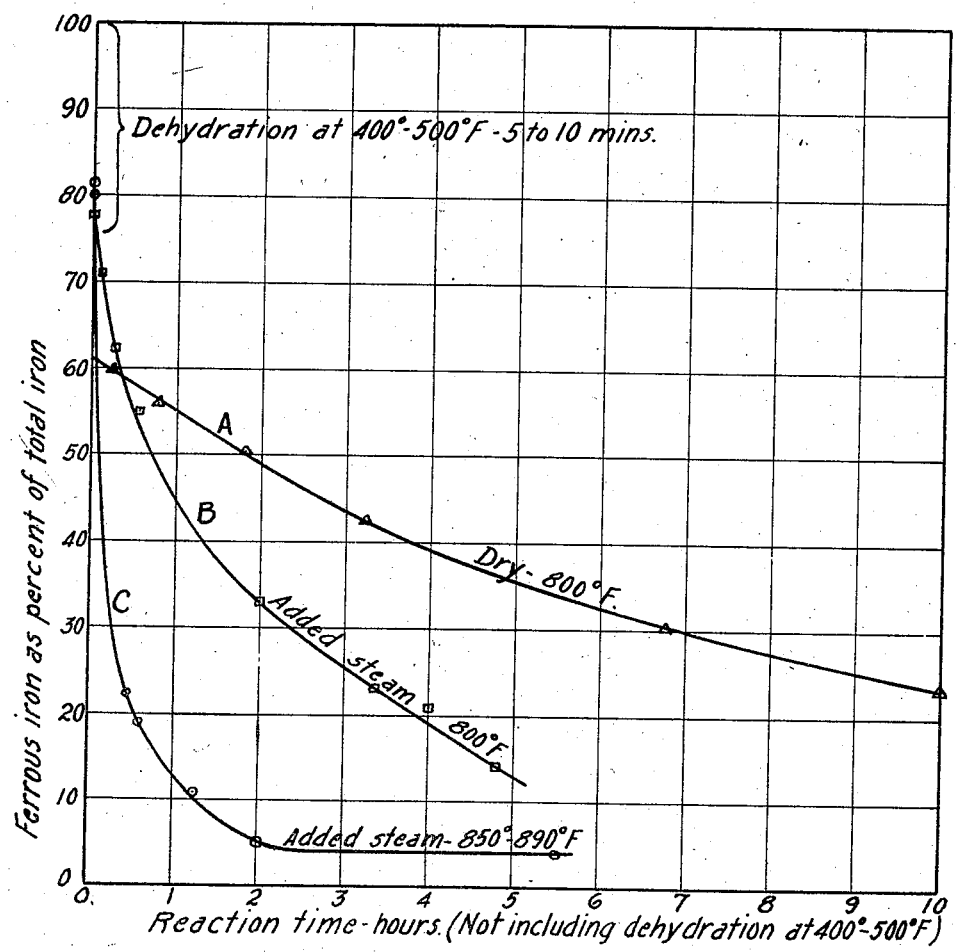

Patented Feb. 3, 1942

2,271,524

UNITED STATES PATENT OFFICE 2,271,524

TREATMENT OF WASTE PICKLING LIQUORS

Leroy F. Marek, Lexington, Mass., assignor to Arthur D. Little, Incorporated, Cambridge, Mass., a corporation of Massachusetts Application April 15, 1940, Serial No. 329,643

12 Claims. (Cl. 23—119)

This invention relates to the preparation of ammonium sulfate. It contemplates in particular a process for the recovery of values from the spent liquor from the pickling of iron and steel, and the treatment of these values with ammonia-bearing gases; such a process serving, among other things, to recover acid for recycling to the pickling operation, to obtain iron, principally as oxide, and to produce substantially iron-free ammonium sulfate.

In the conventional practice for pickling iron and steel bars, sheets and other shapes, wherein a hot bath of dilute sulfuric acid is employed, the pickling bath is reused, with addition of more sulfuric acid as required, until it becomes unsatisfactory for further use because too saturated with salts or too heavily loaded with dirt and sediment. This spent pickling liquor must then be disposed of.

This spent liquor consists essentially of an aqueous solution of ferrous sulfate and free sulfuric acid. It also usually contains traces of sulfates of other metals associated with the pickled iron or steel as alloying elements, impurities, or otherwise,—besides amounts of dirt, scale, and other insoluble and in general inert materials. The spent pickling liquor from continuous strip picklers typically contains 18 to 22 percent ferrous sulfate and 8 to 12 percent sulfuric acid, while that from batch picklers typically contains 20 to 30 percent ferrous sulfate plus 1 to 5 percent sulfuric acid, by processes now commonly used commercially.

Because of the chemical values in spent pickling liquor, many efforts have been made to recover them economically. But as a rule the costs of recovery have exceeded the value of the products recovered, regardless of the particular process used; hence no recovery process has been adopted generally. It follows that the usual procedure is to dispose of the spent pickling liquor in the most inexpensive manner possible consistent with standards of health, sanitation, and stream pollution obtaining in the particular locality. As these standards have become more rigid, the older practice of dumping the spent liquor directly into streams has in many instances been abolished; instead the liquor has as a rule first been neutralized with lime, and then discharged to streams or else allowed to settle, the water decanted, and the sediment hauled to a dry dump. Alternatively, other procedures may be followed according to conditions, but it is significant that practically all these procedures are directed toward getting rid of the spent pickling liquor in the most expedient manner, rather than toward conserving any of its values. A process for recovering these values, which can be carried out at a relatively low cost in proportion to the worth of the products, has long been desired.

The availability of ammonia, as a by-product in the production of coke for metallurgical purposes, in close proximity to iron and steel plants where pickling is done, is advantageous in that this ammonia may be conveniently and economically utilized to react with appropriate constituents or derivatives of spent pickling liquor, to form ammonium sulfate and oxides or other compounds of iron. Ammonia-bearing gas from such source may advantageously be used in the process of the present invention.

It is, therefore, an object of this invention to provide a process for the treatment of spent pickling liquor for recovery of chemical values therefrom.

Another object is to enable the use in such a process of the ammoniacal gas obtained in the production of metallurgical coke.

A further object is to produce substantially iron-free ammonium sulfate from spent pickling liquors and ammonia, and at the same time to recover the iron values, largely as oxides.

Another object is to provide a process whereby, during the treating of the spent pickling liquor, the sulfuric acid content thereof may be recovered.

Still another object is to provide a process of the type described which is operable without the necessity for filtration of the gelatinous or flocculent precipitate of ferrous hydroxide which is so troublesome in most such processes hitherto proposed.

It is also an object of this invention to provide a process of the type and for the purpose described which represents distinct economies in its operation over most if not all of such processes hitherto proposed.

Other objects will be evident from the following disclosure.

A usual procedure for obtaining copperas from spent pickling liquor is to neutralize the excess or free acid in the liquor with scrap iron and then recover the copperas by steps involving evaporation, refrigeration, or both (i. e. concentration together with cooling).

Copperas, however, is itself of relatively little commercial value; hence the conversion of copperas in an economical manner to more valuable and marketable products is particularly desirable. Various processes for doing so have been described in the past. It has been proposed, for example, to calcine or thermally decompose the copperas, after drying to remove water of crystallization, and usually in the presence of some reducing agent such as coke or coal, to produce an iron oxide cinder residue (ferrosoferric oxide) and $SO_2$ gas. The reducing agent decreases the proportion of $SO_3$ evolved relative to $SO_2$,—a condition to be desired because of the troublesome and corrosive nature of $SO_3$ fumes. The $SO_2$ is then oxidized in a separate operation to $SO_3$ which may be converted to $H_2SO_4$ in the usual manner.

However, this process, involving as it does a high temperature calcining operation, a gas purifying operation, and the operation of a sulfuric acid plant, has been found in practice to fall short of being a desirable economical method for copperas utilization.

It has also been proposed to react ammonia with copperas, in solution, for the purpose of obtaining separately ammonium sulfate and oxides of iron.

Likewise, this second process is characterized by very troublesome features, which make practical utilization impossible. Specifically, the iron precipitate is a slimy, gelatinous mass which resists settling and is practically impossible to filter and wash free from adhering salts. Furthermore, an equilibrium condition is set up in which ferrous sulfate and ammonia are in equilibrium with ferrous hydroxide and ammonium sulfate, such that some ferrous sulfate is in solution and remains with the ammonium sulfate when the clear liquor is separated from the slimy precipitate. In view of these objections, special treatment may be resorted to, but even then the operation remains difficult, and commercially impracticable.

In carrying out the procedure of the present invention, the first step is to obtain ferrous sulfate having few or no molecules of water of crystallization—i. e., two or less. This may be done in various ways, as described in detail hereinafter. The ferrous sulfate thus obtained is then subjected to heat and moisture in the presence of oxygen, under conditions so controlled that the iron is largely (80% for example) oxidized to the ferric state, with practically no loss of $SO_2$ or $SO_3$, in a relatively short time and with the formation of little or practically no water-insoluble material,—e. g., less than about 10%. Following this oxidizing step, the product thus obtained is reacted with ammonia in the presence of water, under conditions which are so controlled as to result in substantially complete precipitation of the iron as oxides and/or hydroxides with the simultaneous formation of ammonium sulfate. This ammonium sulfate, which is in solution in the water present, may then be removed as by filtration or decantation; the solution so removed is free from iron. The ammonium sulfate solution, and the iron oxides and hydroxides, may then be worked up in any suitable manner for subsequent use or sale.

This invention will be described in greater detail hereinafter, and with reference to the accompanying drawings, which illustrate in graph form some of the reaction conditions involved.

As already stated, the first step in the present process is to obtain ferrous sulfate having few or no molecules of water of crystallization, using spent pickling liquor as the starting material. Known methods for accomplishing this step may be employed; for example, the liquor may be spray-processed under proper conditions to produce the monohydrate directly; or according to another method, the liquor may be contacted with relatively cold air by spraying or blowing operations to cool and concentrate it and cause precipitation of copperas which, after removal, is heated under carefully controlled conditions to eliminate most or all of its water of crystallization.

As illustrative of the second of the foregoing procedures, consider the treatment of a spent pickling liquor solution coming from continuous strip picklers, having a temperature of about 150° F. at the time of treatment and containing about 18% sulfuric acid and 16% $FeSO_4$, by weight. On contacting relatively cold air with such a solution, as by spraying the solution into air at ambient or lower temperature, the solution is not only reduced in temperature but is also concentrated to some extent. At about 80° F., the solution can still hold dissolved about 16% $FeSO_4$ if 10% sulfuric acid is present; but the percent of sulfuric acid will be greater than 10% due to loss of both $FeSO_4$, through copperas precipitation, and water, through evaporation and through formation of water of crystallization with the $FeSO_4$. The concentration of sulfuric acid is in fact increased in this way to about 20%, at which concentration the solution can contain only about 13% $FeSO_4$ at 80° F. More copperas would precipitate if the temperature were lowered further. Thus, at 32° F., solutions containing respectively 10, 15, and 20% sulfuric acid can contain dissolved only 10, 8, and 6% respectively of $FeSO_4$.

Although it is easily possible to cool the liquor to temperatures of about 75° F. by the use of ordinary air or air that has been washed with cool water, further cooling of the liquor to temperatures well below 75° F., such as to 32° F., requires the use of refrigerated air. It is perfectly feasible to use refrigerated air to cool the liquor to temperatures lower than those obtainable by use of normal atmospheric air, and it may even be desirable, as in instances where the greatest possible reduction in iron sulfate in solution is desired and hot evaporation is not wanted. However, in the ordinary application, normal atmospheric air cooling will be satisfactory.

It will be noted that in the procedure just described, where the liquor, after treatment, has a content of 20% sulfuric acid and 13% $FeSO_4$, that the content of $FeSO_4$ is 65 parts per hundred parts $H_2SO_4$, whereas it was 89 parts per hundred in the untreated spent liquor. Hence, about 27% of the $FeSO_4$ in the untreated liquor is removed by the air-treating process. To the treated liquor is then added an amount of sulfuric acid equivalent to the $FeSO_4$ removed, and also water to make up for that evaporated, and the resulting solution, containing about 18% $H_2SO_4$, 9–10% $FeSO_4$, and the balance water, is recirculated to the pickling operation.

The $FeSO_4 \cdot 7H_2O$ produced by the foregoing procedure may then be dehydrated to reduce or even eliminate the water of crystallization. Considerable care is required in this step, to avoid such temperatures and conditions as will cause the copperas to melt and dissolve in its own water of crystallization, as this results in the formation of hard, bricklike masses as the water is driven off; such masses cake on to the treating apparatus and are generally hard to handle. Partial recycling of the hot dehydrated material to the fresh copperas feed serves to preheat the copperas to a mild, dehydrating temperature, and also to prevent the formation of hard cake in the event that the material is overheated and the melting point exceeded.

Considering further the solubility of FeSO4 in aqueous solutions of sulfuric acid, it is observed that, for any given concentration of sulfuric acid, the FeSO4 is most soluble at temperatures of around 140 to 150° F. Its solubility decreases at temperatures both above and below this region. But at the temperatures below this region (except with high concentrations of H2SO4, e. g., above about 30%) it precipitates as copperas,—i. e. with seven molecules of water of crystallization. On the other hand, the FeSO4 precipitates from solutions above this region as either the mono- or the dihydrate, or as anhydrous FeSO4, depending upon conditions, and not as the heptahydrate. But in all cases, regardless of temperature, the FeSO4 is of decreasing solubility as the concentration of H2SO4 in the solution increases.

In carrying out the production of ferrous sulfate having two or less molecules of water of crystallization in accordance with the preferred procedure of this invention, the foregoing facts with respect to solubility may, for the purpose of illustration, be applied upon spent pickling liquor having an analysis the same as that just given to illustrate the cold-air-treatment process. Such a pickling liquor is accordingly treated with hot air, which is blown in or otherwise effectively contacted with the liquor. As already stated, the solubility of the FeSO4 decreases as the temperature of the solution rises above about 140-150° F. But at about 180-190° F. the direction of the solubility curve reverses again, and at higher temperatures FeSO4 becomes more soluble for any given concentration of H2SO4 in the solution. Of course at higher temperatures the evaporation of water is more rapid; hence in practice the temperature of the liquor should generally be raised by the air treatment to a temperature of at least 180° F., and even up to about the boiling point, depending upon conditions and costs. Upon such treatment, some of the FeSO4 is accordingly precipitated as the dihydrate or the mono-hydrate, or in anhydrous form, or as mixtures of these. As the hot air treatment is continued, the water of the solution is evaporated, and considerably more ferrous sulfate mono-hydrate is precipitated due to its decreased solubility in the presence of increasing concentrations of sulfuric acid, as already pointed out. This procedure may conveniently be continued until the concentration of sulfuric acid is about 40%. At this concentration, the amount of ferrous sulfate in the solution is about 4.5% at a temperature of 180° F. to boiling. Hence the FeSO4 content has been reduced to only 11 parts per hundred parts H2SO4, i. e. 87.5% of the FeSO4 has been dropped out. Thus on making up the pickling liquor to original amount and concentration (18% H2SO4) in the usual manner, the percent of FeSO4 becomes less than 1. By this procedure there is accordingly produced a relatively strong solution of sulfuric acid, free of most of its iron compounds and hence particularly suitable for returning to the pickling operation. Another advantage of this hot air treatment lies in the fact that the sulfates of the metals associated with iron, such as copper, manganese, and nickel sulfate, are precipitated simultaneously with the ferrous sulfate. When removed continuously by such hot air treatment, these salts do not accumulate in the recycle acid and are present in such small amounts that it is ordinarily unnecessary to take steps to remove them. But they may be completely removed if desired, by any suitable method and at any appropriate stage.

The above-described hot-air-treatment process therefore results in the recovery of a liquid which is essentially an aqueous solution of sulfuric acid, with relatively insignificant amounts of impurities,—as constrasted with the liquids resulting from conventional cold treatment processes which are essentially aqueous solutions of ferrous sulfate containing sulfuric acid, as already described. When using the hot-air-treatment it is therefore possible to operate the continuous pickle lines in essentially the same manner as though no recovery of the values in the liquor were to be attempted,—thus drawing off from the pickle lines, for treatment, a spent liquor of the usual type having in the order of 18 to 22% ferrous sulfate and 8 to 12%, or even less, sulfuric acid,—whereas the conditions in the pickling lines have to be modified in order to operate the conventional cold air process for spent liquor treatment.

The next step in this embodiment of the present invention, following the obtaining of ferrous sulfate with two or less molecules of water of crystallization, is that of treating this material under controlled heat, moisture, and oxygen conditions to oxidize it largely to the ferric state with substantially no loss of SO2 or SO3. This step can be more fully explained by reference to Fig. 1, wherein the reaction time in hours is plotted against the ferrous iron as percent of total iron, under varying conditions of operation.

It is of course well known that ferrous iron can be oxidized to ferric iron by subjecting the former to air or other suitable oxidizing medium, and that the rate of this reaction, which is slow at ordinary temperatures, can be increased considerably by raising the temperature. A number of proposals have accordingly been advanced for the oxidation of the iron content of ferrous sulfate to the ferric state, i. e. to form a ferric sulfate, but these processes, if successful in accomplishing this object, have done so in a way which causes loss of SO2 or SO3, and resulted in a product containing a relatively large amount of iron oxide which is, of course, insoluble in water. This loss can be cut down considerably by decreasing the temperature, but the rate of reaction is thereby correspondingly decreased to the point where the time required for oxidation of the iron is extremely long and hence uneconomical.

The first step in the decomposition of anhydrous FeSO4 by heat may be represented by the following equation:

(1) 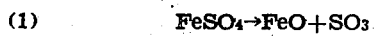$$FeSO_4 \rightarrow FeO + SO_3$$

The SO3, being a strong oxidizing agent, readily reacts with the FeO as follows:

(2) 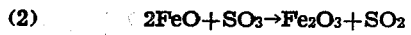$$2FeO + SO_3 \rightarrow Fe_2O_3 + SO_2$$

This Reaction 2 takes place in preference to the reaction:

(3) $$FeO + O \rightarrow Fe_2O_3;$$

hence it follows that to obtain soluble products any appreciable decomposition as in Equation 1 must be avoided, and that the use of even large quantities of oxidizing gas will not prevent or even appreciably diminish the reaction of Equation 2.

In accordance with the present invention, however, it is found that the oxidation may be carried on rapidly and yet at a temperature low enough to avoid any appreciable loss of oxides of sulfur, if an adequate supply of water vapor is present during the oxidation step. This procedure therefore involves the proper control and range of temperature, water vapor, and oxygen as well as of time.

The temperature used is preferably between 800 and 900° F. If lower than about 750° F. the reaction is too slow to be of practical advantage economically, while if higher than about 950° F., objectionable loss of oxides of sulfur occurs. It is, however, advantageous to operate at as high a temperature as possible without decomposition, since the rapidity of oxidation reaction is accordingly increased, and the material being treated is therefore exposed to the heat for a shorter time than if the temperature were lower.

The gaseous treating agent which is contacted with the ferrous sulfate during the heating step should of course contain enough oxygen to permit rapid and adequate oxidation of the iron, and enough water vapor to permit such rapid oxidation at a temperature below that at which any appreciable loss of oxides of sulfur occurs. The actual amount of oxygen and water vapor present will depend upon many factors, but as one example, a gaseous treating agent consisting of air saturated with water vapor at 170° F. may be given. This gas contains about 0.43 lb. water vapor per pound of dry air. A water-vapor content of less than about 0.25 lb. on the same basis is generally inadequate. On the other hand, the water-vapor content may be much higher, so long as enough oxygen is present to effect the desired reaction. The amount of oxygen supplied is, however, a function not only of the relative proportions of air and water vapor, but also of the rate at which the gaseous mixture is supplied to the ferrous sulfate under treatment. It is also a function of the oxygen content of the air; for although ordinary air may conveniently be used, other gaseous media including air reenforced with or deficient in oxygen may also be employed. The air or oxygen-containing gas may be introduced at a temperature considerably in excess of the 170° F. just mentioned; it may, in fact, be the chief or sole source of the heat required to treat the ferrous sulfate in this step. Thus, it may be advantageous to use combustion gases suitably adjusted as to oxygen and moisture content,—as by addition of air and steam, or oxygen and steam.

This oxidizing step may be further illustrated by reference to Fig. 1, which shows a procedure wherein ordinary copperas FeSO$_4$.7H$_2$O is first dehydrated and then subjected to the oxidizing reaction at various temperatures with and without the presence of water vapor. The dehydration was carried out by subjecting copperas to a temperature of about 400 to 500° F. for 5 to 10 minutes, in the presence of air, with agitation, whereby the monohydrate was produced. Alternatively, the procedure hereinbefore described for treating spent pickling liquor to produce directly FeSO$_4$, having two or less molecules of water of hydration, may be used. The dehydration step as shown in Fig. 1 reduces the amount of ferrous iron from 100% to between 75 and 80%. Curve A shows the course of reaction at 800° F. in the absence of water vapor, i. e. by using substantially dry air. Curve B shows the course of reaction at the same temperature but using air containing enough water vapor to saturate it at 170° F. Curve C shows the course of reaction at 850–890° F., and using air saturated as for curve B. It will be noted from these curves that the time required to reduce the ferrous iron content to 20% is somewhat over 10 hours under the conditions of curve A, but only about 4 hours under those of curve B and only ½ hour under those of curve C. Results of the same type are obtained by starting with ferrous sulfate having 2 or less molecules of water of hydration and thus omitting the dehydrating step.

The ferric compound produced by the foregoing procedure has the probable formula $$Fe_2O(SO_4)_2$$

which may also be represented by the formula

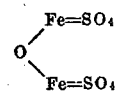

Any suitable apparatus may be used for carrying out the oxidizing step. Conveniently, a rotary kiln may be employed, with external heating means, the ferrous sulfate being introduced at one end and the gaseous treating agent at the other, the operating being preferably countercurrent in any event. The gaseous agent may be previously heated or not, as already indicated. The water vapor may be added as a constituent of the gaseous treating agent, or separately. It may even be added as a mist or spray of water introduced into the heating zone.

The heptahydrate FeSO$_4$.7H$_2$O can not be subjected directly to the above-described process to obtain the results desired herein, as it is unstable at any temperature which will permit an appreciable rate of oxidation. By adopting proper precautions, however, the heptahydrate may be subjected to the foregoing treatment in a one-stage process in a rotary kiln or equivalent apparatus. Thus, operating countercurrently, the portion of the kiln receiving the heptahydrate may be substantially unheated, and the heptahydrate then moves through a zone of proper dehydrating temperature of the range already set forth before entering the hottest zone of about 800–900° F. By properly controlling the temperatures in the zones and the times of passage of the salt therethrough, the heptahydrate is permitted to dehydrate to a proper degree (as hereinabove defined) before reaching the hottest zone, thus avoiding the undesirable melting and hard cake formation already mentioned as due to overheating. It may be undesirable for the moisture-laden air or gas from the hottest zone to pass into the dehydrating zone, due to the obvious tendency of such gas to hinder the dehydration. This can be avoided by leading off this moisture-laden gas at a point near the junction of said zones, and then leading in a sufficiently dry gas of proper temperature which passes through the dehydrating zone.

Other modifications of procedure may be adopted according to the conditions prevailing. In any event, if proper conditions are maintained the product is made up almost wholly (at least about 90%) of sulfates of ferrous and ferric iron. Since these are soluble in water, the product is correspondingly water-soluble. There should accordingly be less than about 10% of water-insoluble materials in the product obtained in this step.

In place of the roasted product obtained by the foregoing procedure, a product of similar composition but otherwise produced may be used as the starting material for the treatment with ammonia described hereinafter. Thus, if ferric sulfate is available from processes other than the steel pickling operation, or if a portion of the ferrous sulfate from the pickling operation can be advantageously oxidized, because of special conditions being available, to ferric sulfate, it then becomes possible to dispense with this roasting operation and to substitute mixtures of this ferric sulfate with ferrous sulfate from the pickling process for the oxidized roast. For instance, if a supply of $SO_2$ is available, it is possible to oxidize ferrous sulfate to ferric sulfate by contacting the aqueous ferrous sulfate solution with air and $SO_2$ gas mixtures. This oxidation, in which the ferrous sulfate and $SO_2$ act as mutual catalysts for the oxidation of each other, may be carried to substantial completion of the iron in solution and then the ferrous sulfate added to give workable proportions of ferric to ferrous iron; or the oxidation may be carried only to the point where such proportions are obtained. However, regardless of how obtained, such ferric-ferrous iron sulfate solutions behave toward the ammonia precipitation treatment described below in a manner comparable with that of the oxidized roast obtained from copperas, with the exception that the precipitate which results is more slimy in nature and not as easily filtered or washed as that from the oxidized roast of ferrous sulfate described above.

The mixed sulfates of ferric and ferrous iron produced by the roasting procedure hereinbefore described, or by other methods, may be used for various purposes. They may, for example, be used as source materials for their component compounds, or they may be used as reagents in various industrial processes. Thus, it is well known to use ferric sulfate or the ferric compound known as chlorinated copperas in the purification of water, by controlling the pH value during treatment (as by adding lime or other alkaline material) so as to throw down the hydroxide of iron which absorbs impurities. Again, the said mixed sulfates of ferric and ferrous iron may be reacted with other compounds to produce other useful chemical products. One such reaction which is of particular interest in connection with the present invention, as already stated, involves the reaction with ammonia, which will now be described.

The mixed sulfates of ferric and ferrous iron produced by the hereinabove described roasting procedure, or otherwise obtained, are reacted with ammonia, which may be introduced in any convenient manner, such as by bubbling ammonia gas into a water suspension or solution of the sulfates, or by introducing the sulfates into aqua ammonia and adding more ammonia gas as desired. The ammonia gas may be pure $NH_3$, or may be any ammonia-bearing gas, such as the by-product ammoniacal gas from the production of metallurgical coke; selection will depend upon the characteristics desired in the finished product, upon the type of ammonia-bearing gases available, and other factors.

The reactions which take place during the ammonia treatment may be represented by the following equations:

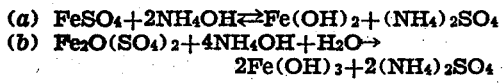

(a) $FeSO_4 + 2NH_4OH \rightleftarrows Fe(OH)_2 + (NH_4)_2SO_4$
(b) $Fe_2O(SO_4)_2 + 4NH_4OH + H_2O \rightarrow$
$2Fe(OH)_3 + 2(NH_4)_2SO_4$ wherein $a$ is the reaction involving the ferrous compound and $b$ is that involving the ferric.

Considering now these reactions and their equilibria, and the conditions under which they take place in the present process, the following features are observed. Reaction $a$ is reversible, while Reaction $b$ proceeds, for all practical purposes, completely to the right. The ferrous hydroxide resulting from Reaction $a$ is of a gelatinous or slimy nature, or forms difficultly-filterable colloidal flocs,—depending on conditions in the solution,—and hence is not easily amenable to separation by filtration, settling, or other usual methods. Filtration and other usual methods are, however, readily used in the separation of the ferric hydroxide resulting from Reaction $b$; it settles fairly rapidly as a granular precipitate. In order to secure completeness of the reactions as far as possible, with consequent conversion of substantially all the sulfates to ammonium sulfate and the iron to readily separable insoluble form, it is advisable to have the iron principally in the ferric form. The presence of a relatively small proportion of ferrous iron is not objectionable, however, as small amounts of ferrous hydroxide are precipitated readily with relatively large amounts of ferric hydroxide, in this process. In other words, conditions should be such in the ammonia treatment that the principal reaction is that of $b$, while Reaction $a$ takes place to a relatively minor degree.

It is found in accordance with the present invention that the reactions which occur in the ammonia treatment proceed sufficiently far to completion, and provide an ammonium sulfate solution of adequate strength, if at least about 75% of the iron is in the ferric state. The process can be operated reasonably well with a somewhat smaller amount of ferric iron, but less than about 60% thereof is unsatisfactory, due to the difficulties already pointed out which result when using ferrous iron. Referring now to Fig. 1, it is seen that by following the conditions of curve C, between 80 and 90% of the iron is converted to the ferric form by roasting for ½ to 1 hour. This is true whether the starting material is dehydrated copperas, as shown in the drawing, or the slightly-hydrated ferrous sulfate prepared directly as such from pickling liquor in the manner already described herein. As a practical matter, however, it is not convenient to convert more than about 90% of the iron to the ferric form, for to do so requires too long a heating time for economical operation. Prolonged heating, especially at the higher temperatures such as 900° F., also causes some loss of oxides of sulfur,—for while this loss is negligible in short-period operations of about an hour or less, it builds up over a longer period to the point where a small but significant amount of ferric oxide is produced. This ferric oxide is very finely divided, and may be troublesome either because of dusting during the roasting operation or because of passage through the filters during the subsequent filtration step.

Figure 2:
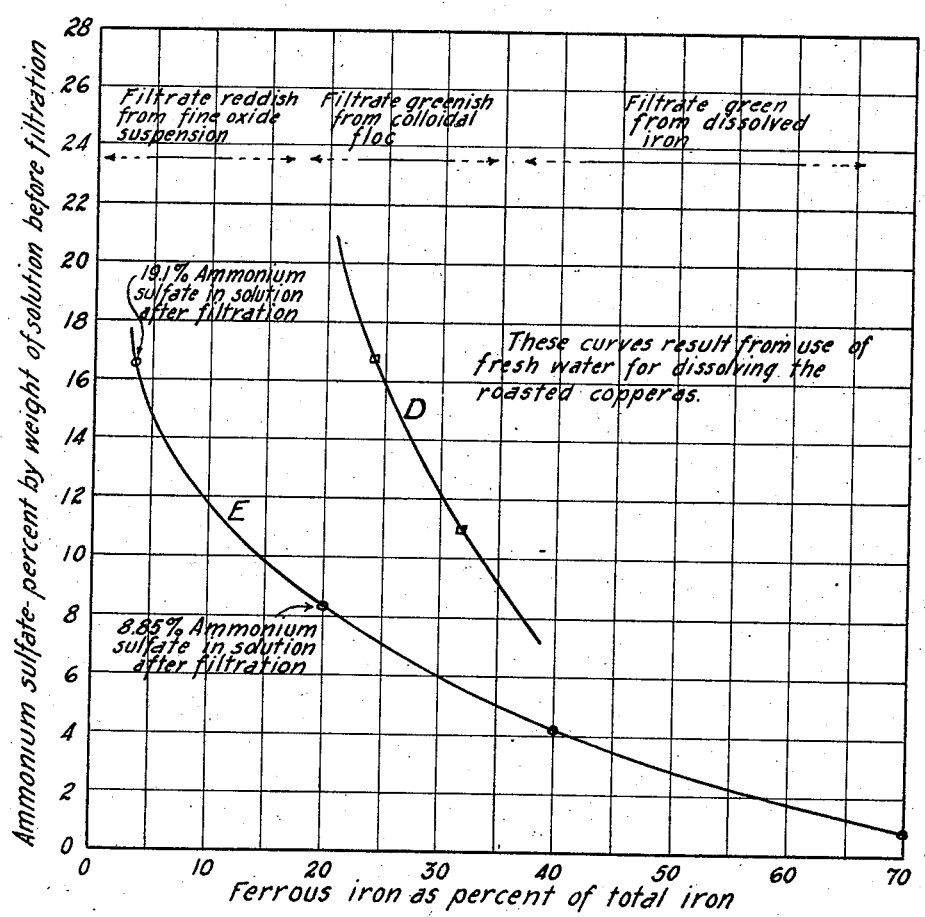

The ammonia treatment of the oxidized roast or of the ferric-ferrous sulfate mixture otherwise obtained, can be more fully explained by reference to the graph shown in Fig. 2, wherein the amount of ferrous iron as percent by weight of total iron in the oxidized roast or mixture is plotted against the concentration of ammonium sulfate as percent by weight of the total solution (resulting from the ammonia treatment) before the filtration step. Plotted in Fig. 2 are curves D and E, which represent the approximate boundary lines between those conditions which result in clear filtrates and those which result in cloudy and/or colored filtrates. The distinction between curves D and E is as follows: If the solution or suspension resulting from treatment of the oxidized roast with ammonia is filtered without auxiliary treatment, curve E applies; while if auxiliary treatment, such as boiling or a filter-aid, is used, curve D applies. In other words, a solution whose characteristics place it between curves D and E will not give a clear filtrate unless it is given such auxiliary treatment. The effect of this treatment is essentially to coagulate (in the case of boiling) or to adsorb (in the case of filter-aids) the flocculent or gelatinous ferrous hydroxide or very fine reddish iron oxide, and thus to permit a clear solution to be obtained under conditions which would otherwise result in a cloudy and/or colored solution, contaminated with ferrous hydroxide and/or other iron compounds.

The characteristics of the filtrates which fall above and to the right of curves D and E are indicated in part by the legend at the top of the graph. For example, if the filtrate is not clear, and it contains about 15% or less ferrous iron on total iron, the contaminant is largely the reddish ferric oxide, in suspension; when the ferrous iron percentage is about 15 to 35, the contaminant is largely the greenish ferrous hydroxide, in suspension as colloidal flocs; when the ferrous iron percentage is still higher, the contaminant is largely ferrous salts in solution.

It will be observed, by reference to Fig. 2, that a clear filtrate of ammonium sulfate, uncontaminated by either suspended solids or dissolved substances other than ammonium sulfate, can be obtained even if the ferrous iron is present in the oxidized roast in an amount greater than that of the ferric iron. But it is equally clear that the ammonium sulfate solutions thus obtained are so dilute that they are unsuitable as a source for the economical recovery of ammonium sulfate.

As a practical operating matter, therefore, the amount of ferrous iron should be kept as low as reasonably possible, as already pointed out, and the amount of ammonia and water used should be such as to ensure as concentrated a solution of ammonium sulfate as can be obtained, consistent with ready filterability, and freedom from iron in the filtrate. The maximum such concentration possible is one represented by about 20% ammonium sulfate on the ordinate scale of Fig. 2, when starting with the reaction products of Equations a and b; under such circumstances an appreciably higher concentration cannot be obtained practically as the water present would be insufficient to dissolve all the soluble iron compounds,—these being in general less soluble than ammonium sulfate. It is, however, entirely possible to build up the concentration of ammonium sulfate by the use of recycled liquor, to a point where the solution is saturated with ammonium sulfate, irrespective of the concentration of iron salts. In such cases the relationships already discussed still hold; i. e. the concentration of ammonium sulfate in the solution is an important determinant of the ferrous equilibrium, whether or not the added iron component is equivalent to the ammonium sulfate stoichiometrically.

For the foregoing reasons, therefore, the preferred operating range lies below and to the left of curve D, and above the ordinate representing 8% of ammonium sulfate in the solution before filtration; in Fig. 2. Hence also the percent of ferrous iron on total iron should not exceed about 35 to 40% (i. e. 60–65% ferric iron),— a conclusion which coincides with that already set forth herein. It has also been noted, as indicated in Fig. 2, that this maximum permissible percentage of ferrous iron is that beyond which the filtrate, if not clear and uncolored, is contaminated with dissolved ferrous sulfate. This follows from the equilibria of the reaction of Equation a.

The filter-aid may be any one or more of a number of materials commonly used for the purpose of promoting rapidity and thoroughness of filtration—for example, diatomaceous earth, wood pulp, or carbonaceous material such as finely divided graphite. The filter-aid and boiling may both be employed in treating the same batch of liquid. Also, while the use of filter-aids and boiling is intended principally for those liquids whose characteristics are represented by the area between curves D and E on Fig. 2, they may if desired be used on liquids whose characteristics place them below and to the left of curve E.

The products of the treatment herein described are of course the ammonium sulfate solution and the solids from which said solution is separated. These solids are principally or wholly oxides of iron, more or less hydrated. They are therefore suitable for a number of uses,—for example, they may be charged into a blast furnace as a source of iron. They may also be used for other purposes, depending in some instances upon the relative amounts of ferrous and ferric iron present. Further processing may be employed if desired to fit these solids for such uses.

The ammonium sulfate solution is free from iron and hence may be worked up to form practically pure ammonium sulfate simply by evaporating the water of the solution. Or it may be used as a solution, if desired. On the other hand, the ammonia gas used in the process of the present invention may contain impurities of a nature which will cause contamination of the ammonium sulfate solution, although such a condition may in some instances be not undesirable. The fact that ammonia gas from any particular source contains impurities does not, however, necessarily mean that the resulting ammonium sulfate solution will be impure, for some types of impurities react to form insoluble materials and are separated with the oxides of iron, and others may be removed or rendered innocuous in the roasting step.

I claim:

1. Process for the treatment of spent pickling liquor, which comprises maintaining a spent liquor containing sulfuric acid and ferrous sulfate at a temperature above about 150° F. and evaporating water therefrom, removing the precipitated ferrous sulfate, subjecting the said ferrous sulfate for a sufficient time to an oxygen-containing gas and water vapor while maintaining it at a temperature between 750° and 950° F. to oxidize the major proportion of the iron to the ferric state without appreciable loss of oxides of sulfur, subjecting the resulting oxidized roast to ammonia in the presence of water, to produce ammonium sulfate, and separating said ammonium sulfate from the reaction mixture as an aqueous solution substantially free from iron.

2. Process for the treatment of spent pickling liquor, which comprises maintaining a spent liquor containing sulfuric acid and ferrous sulfate at a temperature above about 150° F. and evaporating sufficient water therefrom to cause precipitation of the major proportion of the ferrous sulfate in the form of $FeSO_4 \cdot XH_2O$ wherein X is less than 3, removing the said precipitated ferrous sulfate, subjecting the said ferrous sulfate for a sufficient time to an oxygen-containing gas and water vapor while maintaining it at a temperature between 750° and 950° F. to oxidize the major proportion of the iron to the ferric state without appreciable loss of oxides of sulfur, subjecting the resulting oxidized roast to ammonia in the presence of water, to produce ammonium sulfate, and separating said ammonium sulfate from the reaction mixture as an aqueous solution substantially free from iron.

3. Process for the treatment of ferrous sulfate, which comprises subjecting a ferrous sulfate having the formula $FeSO_4 \cdot XH_2O$ wherein X is less than 3, for a sufficient time to an oxygen-containing gas and water vapor while maintaining it at a temperature between 750° and 950° F. to oxidize the major proportion of the iron to the ferric state without appreciable loss of oxides of sulfur, subjecting the resulting oxidized roast to ammonia in the presence of water, and separating the resulting ammonium sulfate from the reaction mixture as an aqueous solution substantially free from iron.

4. Process for the treatment of ferrous sulfate, which comprises dehydrating ferrous sulfate heptahydrate sufficiently to remove at least five molecules of water of crystallization, then subjecting the ferrous sulfate so dehydrated for a sufficient time to oxygen and water vapor while maintaining it at a temperature between 750° and 950° F. to oxidize the major proportion of the iron to the ferric state without appreciable loss of oxides of sulfur, subjecting the resulting oxidized roast to ammonia in the presence of water, and separating the resulting ammonium sulfate from the reaction mixture as an aqueous solution substantially free from iron.

5. Process for the treatment of ferrous sulfate which comprises subjecting a ferrous sulfate having the formula $FeSO_4 \cdot XH_2O$ wherein X is less than 3, to a temperature between 750° and 950° F. in the presence of an oxygen-containing gas and water vapor, the water vapor being present in at least the proportion of about one pound thereof to each four pounds of said gas in dry form, continuing the treatment until the major proportion of the iron is oxidized to the ferric state and discontinuing the treatment before any substantial amount of oxides of sulfur are lost by volatilization.

6. Process for the treatment of ferrous sulfate, which comprises dehydrating ferrous sulfate heptadydrate sufficiently to remove at least the major proportion of its water of crystallization, then subjecting the ferrous sulfate so dehydrated to a temperature between 750° and 950° F. in the presence of an oxygen-containing gas and water vapor, the water vapor being present in at least the proportion of about one pound thereof to each four pounds of said gas in dry form, continuing the treatment until the major proportion of the iron is oxidized to the ferric state and discontinuing the treatment before any substantial amount of oxides of sulfur are lost by volatilization.

7. Process for the treatment of ferrous sulfate, which comprises subjecting a ferrous sulfate having the formula $FeSO_4 \cdot XH_2O$ wherein X is less than 3, to an elevated temperature in the presence of a gaseous treating agent containing free oxygen and water vapor, the water vapor being present in at least the proportion of about one pound thereof to each four pounds of the gaseous agent in dry form, and controlling the time and temperature conditions so as to oxidize the major proportion of the iron to the ferirc state while avoiding the volatilization and loss of any substantial amount of oxides of sulfur.

8. Process for the treatment of ferrous sulfate, which comprises subjecting a ferrous sulfate having the formula $FeSO_4 \cdot XH_2O$ wherein X is less than 3, to a temperature between 750° and 950° F. in the presence of a gaseous treating agent containing free oxygen, and water vapor, said water vapor being substantially in excess of that required to saturate said gaseous treating agent at ordinary temperatures, and also being in addition to any water vapor evolved by removal of water of crystallization from said ferrous sulfate, continuing the treatment until the major proportion of the iron is oxidized to the ferric state and discontinuing the treatment before any substantial amounts of oxides of sulfur are lost.

9. Process for the recovery of values from sulfates of iron, which comprises subjecting an at least partially dehydrated ferrous sulfate to controlled conditions of temperature, oxygen, and moisture for a sufficient time to convert at least about 60% of the iron to the ferric state while maintaining substantially all the iron of the original ferrous sulfate as sulfates of iron, and then reacting said sulfates of iron with ammonia in the presence of water, the proportions of said components being such that the resulting ammonium sulfate is present in an amount at least equal to about 8% of the total mixture by weight, and also such that the said resulting ammonium sulfate may be separated from the mixture by filtration as a clear, colorless solution substantially free from iron.

10. Process for the recovery of values from sulfates of iron, which comprises reacting a mixture of sulfates of ferrous and ferric iron wherein at least about 75% of the iron is ferric, with ammonia in the presence of water, the proportions of the components being such that the resulting ammonium sulfate is present in an amount at least equal to about 8% of the total mixture, by weight, and also such that the said resulting ammonium sulfate may be separated from the mixture by filtration as a clear, colorless solution substantially free from iron.

11. Process for the recovery of values from sulfates of iron, which comprises reacting a mixture of sulfates of ferrous and ferric iron wherein at least about 75% of the iron is ferric, with ammonia in the presence of water, the proportions of the components being such that the resulting ammonium sulfate is present in an amount at least equal to about 8% of the total mixture, by weight, and then removing by filtration the resulting ammonium sulfate as a clear, colorless solution substantially free from iron, and promoting the filtering operation by auxiliary treatment which comprises using a filter aid.

12. Process according to claim 11, wherein said auxiliary treatment comprises boiling the mixture prior to filtration.

LEROY F. MAREK.